United States Patent [19]
Shinjo et al.

[11] Patent Number: 5,627,464
[45] Date of Patent: May 6, 1997

[54] ROTATION ANGLE DETECTING DEVICE FOR A CAMSHAFT PROVIDED IN AN INTERNAL COMBUSTION ENGINE

[75] Inventors: Izuru Shinjo; Noriaki Hayashi; Akio Saito, all of Hyogo, Japan

[73] Assignee: Mitsubishi Denki Kabushiki Kaisha, Tokyo, Japan

[21] Appl. No.: 506,346

[22] Filed: Jul. 24, 1995

[30] Foreign Application Priority Data

Mar. 17, 1995 [JP] Japan ..................... 7-059353

[51] Int. Cl.$^6$ .............. G01B 7/30; F02P 17/00; F01L 1/00
[52] U.S. Cl. .................. 324/207.2; 324/207.25; 123/617
[58] Field of Search ................... 324/173, 174, 324/207.2, 207.21, 207.25; 123/414, 617, 146.5 A

[56] References Cited

U.S. PATENT DOCUMENTS

| 4,454,856 | 6/1984 | Fox et al. ........................... 123/617 |
| 5,028,868 | 7/1991 | Murata et al. ...................... 324/207.2 |
| 5,299,451 | 4/1994 | Brosse .......................... 324/207.2 X |

FOREIGN PATENT DOCUMENTS

| 4029815 | 4/1991 | Germany. |
| 4431026 | 3/1995 | Germany. |
| 60-23714 | 2/1985 | Japan. |
| 4-69656 | 6/1992 | Japan. |

Primary Examiner—Gerard R. Strecker
Attorney, Agent, or Firm—Sughrue, Mion, Zinn, Macpeak & Seas

[57] ABSTRACT

A rotation angle detecting device according to the present invention comprises: a sensor having a first yoke made of a magnetic material on which a magnet is mounted, a second yoke made of a magnetic material on which a magnetic flux detector is mounted, which is disposed opposite to the first yoke with a predetermined space, and a housing for supporting the first yoke and the second yoke, and a vane secured on a camshaft of an internal combustion engine, having a wall portion which passes through space between the first yoke and the second yoke, and a rotation angle of the internal combustion engine is detected in accordance with a signal produced at said magnetic flux detecting device by passage of the wall portion of said vane through said space.

5 Claims, 3 Drawing Sheets

ROTATION ANGLE DETECTING DEVICE FOR A CAMSHAFT PROVIDED IN AN INTERNAL COMBUSTION ENGINE

BACKGROUND OF THE INVENTION

1. Field of the Invention

The present invention relates to a rotation angle detecting device, provided at an end of a camshaft of an internal combustion engine, which detects a rotation angle of the camshaft.

2. Description of the Prior Art

FIG. 4 is a cross sectional view showing a structure of a conventional rotation angle detecting device. In FIG. 4, the reference numeral 1 denotes a housing of a rotation angle detecting device. The housing is composed of an aluminum casting or the like, and mounted on an internal combustion engine 4 while being positioned by a mounting surface 2 and a spigot portion 3 in the axial direction and the radial direction respectively. Reference numeral 5 denotes a shaft of the rotation angle detecting device. The shaft 5 is supported on the housing 1 with bearings 6 and 7, and connected to a camshaft 9 of the internal combustion engine 4 through a coupling 8. Further, the shaft 5 is rotated in synchronism with the camshaft 9, and a vane 10 which acts as a rotor of the rotation angle detecting device is secured to an end of the shaft 5.

The vane 10 is made of a magnetic material and cup-shaped. As shown in FIG. 5, one or more wall portions 12 are provided on the cylindrical portion 11 of the vane 10. The reference numeral 20 denotes a sensor mounted on the housing 1. The sensor 20 is composed of a first yoke 21 of a magnetic material, a second yoke 22 of the same magnetic material, which is opposite to the first yoke 21, a magnet 23 secured on the first yoke 21, a magnetic flux detector 24 such as a Hall element or the like, which is opposite to the magnet 23, and a subhousing 25 which holds them. The subhousing 25 is molded with synthetic resin and at the same time, a connector portion 26 which projects outside the housing 1 is integrally molded. Further, a terminal 27 is formed at the interior of the connector portion 26. The subhousing 25 is also molded so that a plurality of conductors 28 form an interconnection to the Hall element. A slit 29 is provided between the first yoke 21 and the second yoke 22 which is opposite thereto, and between the magnet 23 and the magnetic flux detector 24 which is opposite thereto. In the slit 29 rotates the wall portion of the cylindrical portion 11 of the vane 10 while keeping space. A cover 30 shields the second yoke 22 and the magnetic flux detector 24: a top cover 31 of the housing 1, an oil seal, 32 an O-ring 33, and a packing 34 are provided in order to insulate the sensor from water or oil.

In thus formed conventional rotation angle detecting device, when the shaft 5 is driven by means of the camshaft 9, the vane 10 is rotated, and the wall portion 12 provided in the cylindrical portion 11 of the vane 10 passes through the slit of the sensor 20, in accordance with a rotation angle. When the wall portion 12 of the vane 10 is not inside the slit 29, the magnetic flux of the magnet 23 passes through a magnetic path formed by means of the first yoke 21 and the second yoke 22 which is opposite thereto, and also by means of the magnet 23 and the magnetic flux detector 24 which is opposite thereto. The output signal of the magnetic flux detector 24 reaches a low level L. When the wall portion 12 enters the slit 29, the magnetic flux of the magnet 23 passes through a magnetic path formed by the first yoke 21, the wall portion 12 of the vane 10 and the magnet 23. However, since the magnetic flux does not pass through the magnetic flux detector 24, the output signal is changed to a high level H.

Thus, the rotation angle detecting device is constructed in a manner that it transmits a signal H and a signal L repeatedly, in accordance with the rotation angle of the camshaft 9, and detects the rotation angle of the camshaft 9, i.e., the crank shaft of the internal combustion engine. Further, lubricating oil is required for the bearings 6 bearing the shaft 5, and the bearings 6 are supplied with the lubricating oil from the camshaft 9 side. In order to prevent the lubricating oil leak, an oil seal 32 and an O-ring 33 are provided. Further, in order to prevent the entry of water from the outside, the packing 34 is provided for the top cover 31, so that the space where the magnet 23, the magnetic flux detector 24 and vane 10 are located has a waterproof construction.

Thus formed conventional rotation angle detecting device has a number of components other than the sensor 20 and the vane 10 which are needed for essential functions, and requires many man-hours in additional manufacture and work of parts other than the essential functional parts. Further, many parts requires many man-hours in the assembly of the rotation angle detecting device.

SUMMARY OF THE INVENTION

Accordingly, the present invention has been made to 5 solve the above mentioned problems, and the object of the present invention is to provide a rotation angle detecting device whose structure is simple and whose manufacturing cost is low, by decreasing additional parts other than the essential functional parts.

A rotation angle detecting device according to the present invention comprises: a sensor including a first yoke made of a magnetic material on which a magnet is mounted, a second yoke made of a magnetic material on which a magnetic flux detector is mounted, which is disposed opposite to the first yoke with a predetermined space, and a housing for supporting the first yoke and the second yoke, and a vane secured on a camshaft of an internal combustion engine, which has a wall portion which passes through space between the first yoke and the second yoke, whereby a rotation angle of the internal combustion engine is detected in accordance with a signal produced at said magnetic flux detecting device by passage of the wall portion of said vane through said space.

The housing of the sensor is integrally molded with a connector portion by synthetic resin, and a molded interconnecting conductor of the connector portion and a magnetic flux detector are insert molded, whereby the positioned housing of the sensor is mounted on the internal combustion engine.

The housing of the sensor is integrally molded with the mounting portion for the internal combustion engine, and is directly mounted on the internal combustion engine through a sealing material, so that space in which the magnet, magnetic flux detector and the vane are secured is waterproofed.

Further, the housing of the sensor is directly positionedly mounted on the internal combustion engine.

Further, a sealing material is provided between the mounting surface of the housing of the sensor and the sensor mounting surface of the internal combustion engine, so that space surrounded by the housing of the sensor and the internal combustion engine, which has the magnet, magnetic flux detector and the vane can be waterproofed.

According to the thus formed rotation angle detecting device, a vane which acts as a rotor is directly mounted on a camshaft. Accordingly, a shaft of the rotation angle detecting device and bearings to bear the shaft are not required. Consequently, lubricating oil and an oil seal are not also required. Further, a housing of the sensor is directly mounted on the internal combustion engine, and positioning and waterproofing structure can be attained. As a result, a housing and a cover or the like made of aluminum or the like, which has been used are not required.

The above and further objects and novel features of the invention will be more fully explained in the following detailed description of the preferred embodiments when the same is read in connection with the accompanying drawings. It is to be expressly understood, however, that the drawings are for the purpose of illustration only, and are not intended as a definition of the limits of the invention.

DESCRIPTION OF THE PREFERRED EMBODIMENTS

Embodiment 1

Figure 1:
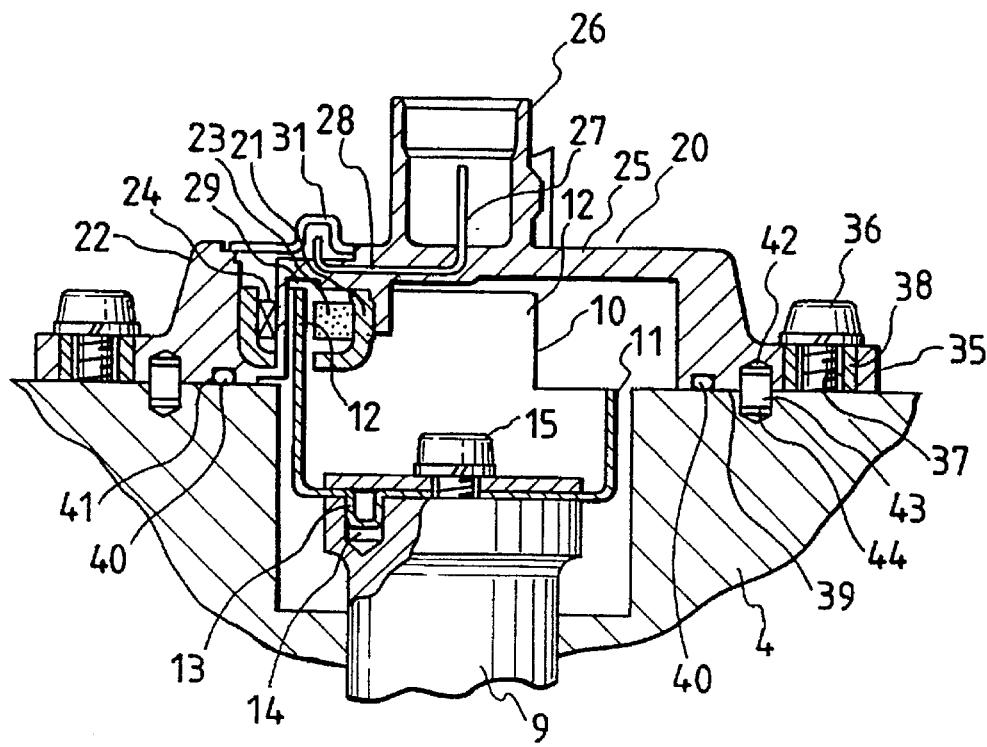
FIG. 1 is a cross sectional view showing a rotation angle detecting device of an Embodiment according to the present invention.
Figure 2:
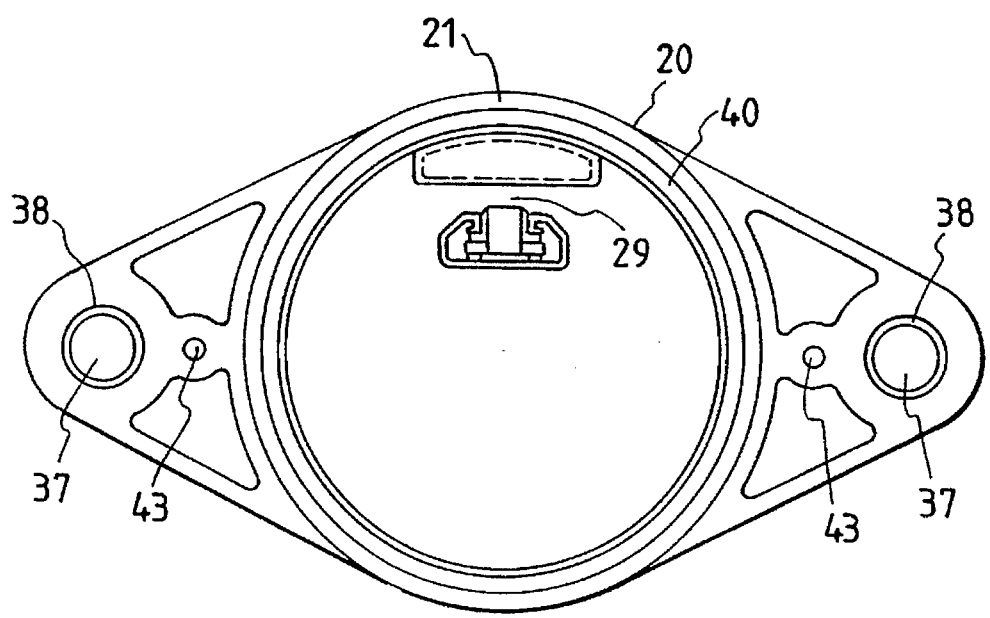
FIG. 2 is a plan view of the sensor of an Embodiment according to the present invention, seen from the bottom.
Figure 4:
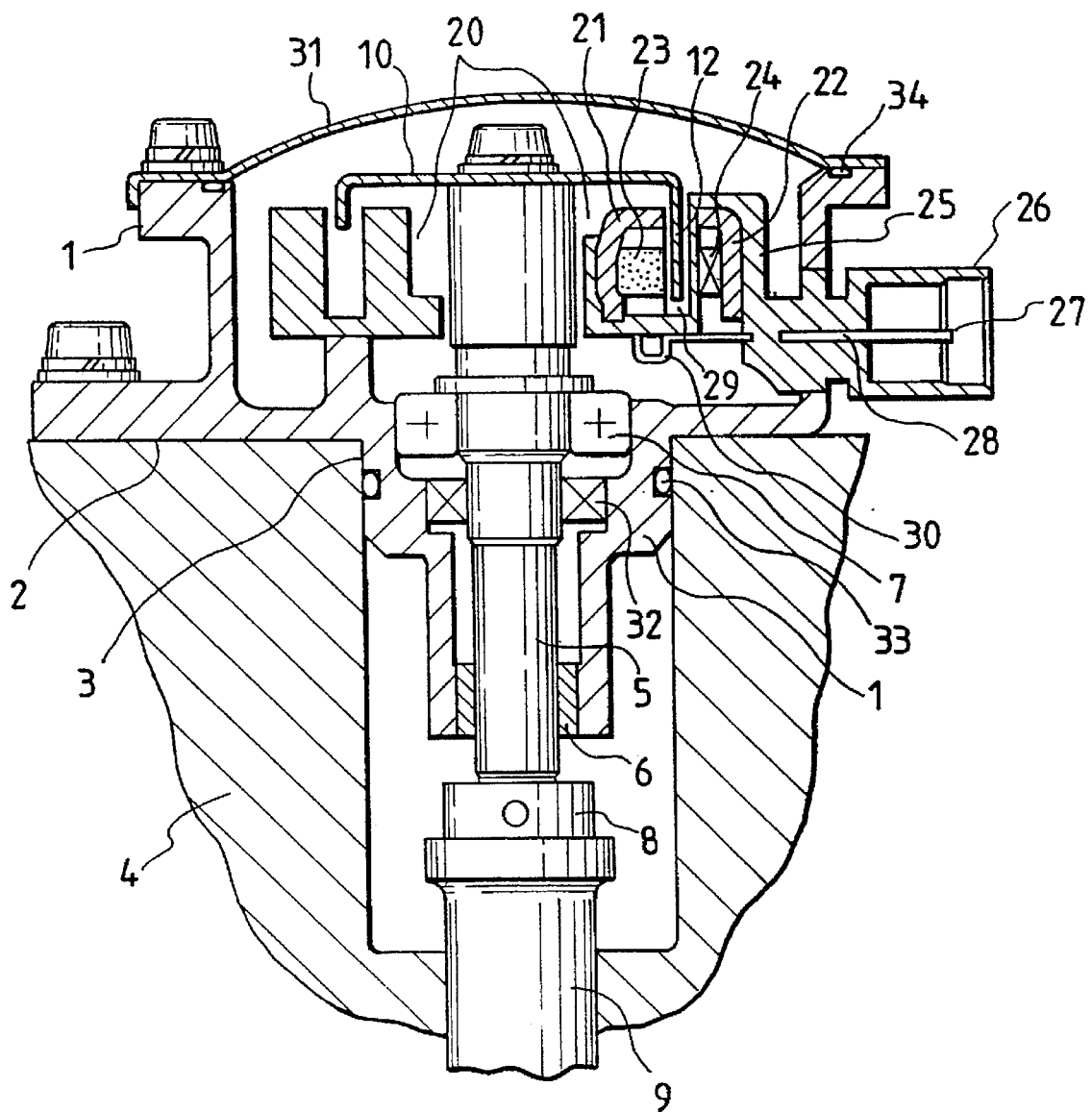
FIG. 4 is a cross sectional view showing a conventional rotation angle detecting device.

FIG. 1 is a cross sectional view showing a rotation angle detecting device of Embodiment 1 according to the present invention, and FIG. 2 is a plan view of the sensor of Embodiment 1 according to the present invention, seen from the bottom. In FIGS. 1 and 2, the same parts as in the conventional embodiment shown in FIG. 4 are denoted by the same reference numerals. Thus, the detailed explanations are omitted. As shown in FIGS. 1 and 2, a vane 10 which acts as a rotor is directly mounted on a camshaft 9. A pin shaped projection 13 at the base of the vane 10 is fitted into a knock hole 14 provided in the camshaft 9, and secured to the camshaft 9 with an upper screw 15. A first yoke 21 has a magnet 23 and a second yoke 22 has a magnetic flux detector 24.

A sensor 20 is constructed in a manner that a housing 25 made of synthetic resin secures the first yoke 21 and the second yoke 22 inside and that a connector portion 26 and a mounting portion 35 for an internal combustion engine 4 are integrally molded with the housing 25 of the sensor. A conductor 28 is insertedly molded with the housing 25 of the sensor, and the conductor 28 forms interconnection for the magnetic flux detector 24 composed of a Hall element or the like and a terminal 27 in the connector portion 26. A mounting hole 37 for mounting the sensor 20 on the internal combustion engine with a screw 36 is provided at a mounting portion 35 of the housing 25 of the sensor 20, and a bush 38 is insertedly molded or pressed into the mounting hole 37. A recess 41 and a knock hole 42 are provided on a mounting surface 39 for the housing 25 of the sensor 20. A sealing material 40 such as an O-ring or the like is inserted into the recess 41, and positioning pins 43 such as knock pins or the like are inserted into the knock hole 42.

In the thus constructed rotation angle detecting device, the vane 10 is mounted on the camshaft by means of the pin-shaped projection 13, which is positioned at a predetermined radial distance relative to a center axis of the camshaft 9 and the screw 15 which positions the vane 10 for movement in the direction of rotation of the camshaft 9. The housing 25 of the sensor 20 is positioned by providing the positioning pins 43 at a plurality of points which are spaced a predetermined radial distance relative to a center axis of the camshaft 9 and mounted by means of the screws 36. As a result, the wall portion 12 of the vane 10 can be rotated in the slit 29 of the housing of the sensor 20 while keeping a certain space between the first yoke 21 and the second yoke 22. Further, the sealing material 40 for the mounting surface 39 of the housing 25 of the sensor 20 secures waterproofing structure for the space surrounded by the housing 25 of the sensor and the internal combustion engine 4. Therefore, even if parts which require a number of man-hours in working, such as a shaft, housing, or coupling and were needed in the conventional rotation angle detecting device are removed, sufficient functions can be attained in the rotation angle detecting device according to the present invention.

Positioning of the housing 25 of the sensor 20 relative to the internal combustion engine 4 has been executed by means of the positioning pins 43 in the above Embodiment 1. However, the positioning thereof with screws 36 can be executed by decreasing size difference between the outer diameter of the screw 36 and the inner diameter of the bush 38 in FIG. 1. Therefore, according to Embodiment 2, working of a positioning pin and a knock hole can be further omitted.

Positioning of the housing 25 of the sensor 20 has been executed by means of positioning pins 43 and a knock hole of the housing 25 of the sensor 20 in the above Embodiment 1. However, positioning pins 43 can be integrally molded with the housing of the sensor 20, and in this case, knock hole working may be executed only by knock working of the internal combustion engine 4. Further, the positioning pins 43 can be also integrally formed at the side of the internal combustion engine 4.

Although, as a sealing material 40 a solid material such an O-ring or the like have been used, a liquid sealing material may be applied between the mounting surface 39 of the housing 25 of the sensor 20, thereby attaining waterproofing structure.

Embodiment 2

Figure 3:
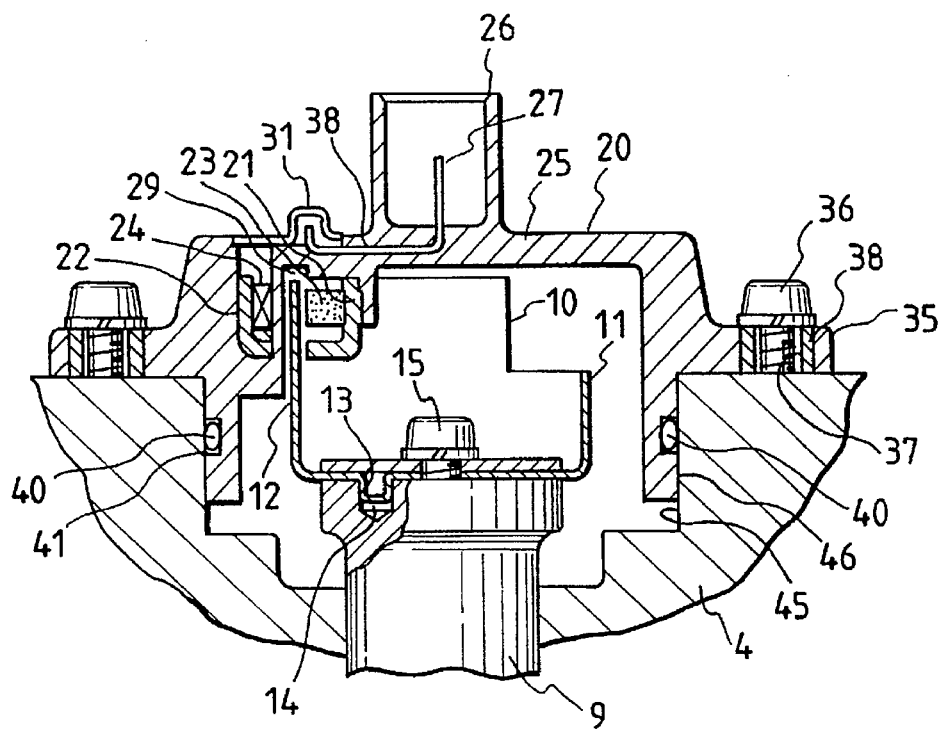
FIG. 3 is a cross sectional view showing a rotation angle detecting device of another Embodiment according to the present invention.
Figure 5:
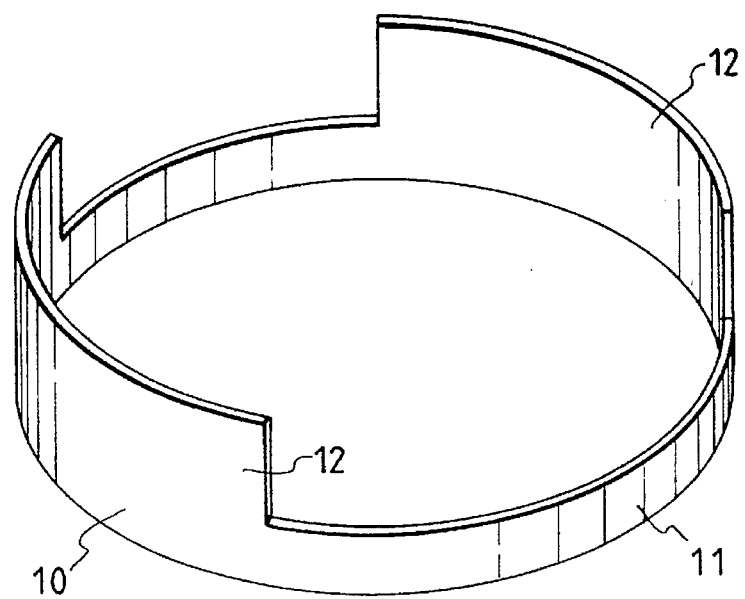
FIG. 5 is a perspective view showing a structure of a vane of the rotation angle detecting device.

FIG. 3 is a cross sectional view showing another Embodiment. In this Embodiment, a spigot portion 46 which fits to a fitting portion 45 of the internal combustion engine is provided for the housing 25 of the sensor 20, positioning of the sensor 20 in the radial direction is ensured by this fitting, and positioning thereof in the direction of rotation is executed with screws 36. According to this Embodiment, holes 37 of the housing 25 of the sensor 20 may be long holes, whereby a preset angle of the rotation angle detecting device can be controlled. Further, as shown in FIG. 3, a sealing material 40 is applied to the recess 41 of the spigot portion 46 as an O-ring, whereby waterproofing structure can be also attained.

As explained above, according to the present invention, a rotation angle detecting device can be constructed by a sensor in which a connector and a mounting portion are integrally formed, a vane which acts as a rotor, and mounting members such as screws or the like. Accordingly, the number of parts of the device are small and the structure thereof is simple. Additionally, a housing or a shaft which requires high manufacturing cost is not needed, and an inexpensive rotation angle detecting device can be provided. Further, since a metal part such as a housing or a shaft is omitted, weight saving for the internal combustion engine can be also realized.

What is claimed is:

1. A rotation angle detecting device comprising:

a sensor having a first yoke made of a magnetic material on which a magnet is mounted, a second yoke made of a magnetic material on which a magnetic flux detector is mounted, the second yoke being disposed opposite to said first yoke with a preset space set between the first and second yokes, and a housing for supporting said first yoke and said second yoke; and a vane having a wall portion, said vane being secured directly to a camshaft of an internal combustion engine and positioned relative to said first and second yokes so that said wall portion can pass through said preset space between said first yoke and said second yoke as the vane rotates with the camshaft;

wherein said vane further comprises a pin-shaped projection positioned within a knock hole of said camshaft at a predetermined radial distance relative to a center axis of said camshaft wherein said housing is mounted on said internal combustion engine; and wherein a rotation angle of said shaft of the internal combustion engine is detected in accordance with a signal produced at said magnetic flux detecting device by passage of the wall portion of said vane through said space which blocks the passage of magnetic flux generated by said magnet.

2. A rotation angle detecting device according to claim 1, wherein said sensor further comprises a conductor and said housing of said sensor further comprises a connector portion integrally molded thereto, said conductor being insertedly molded within said housing and forming an interconnection between said connector portion and said magnetic flux detector.

3. A rotation angle detecting device according to claim 2, wherein said housing of said sensor is formed from synthetic resin.

4. A rotation angle detecting device according to claim 1, wherein the housing of said sensor further comprises a mounting portion integrally molded thereto, said mounting portion being directly mounted on said internal combustion engine using a sealing material so that the interior of the housing in which the magnet, magnetic flux detector, and the vane are secured is waterproofed.

5. A rotation angle detecting comprising:

a sensor having a first yoke made of a magnetic material on which a magnet is mounted, a second yoke made of a magnetic material on which a magnetic flux detector is mounted, the second yoke being disposed opposite to said first yoke with a preset space set between the first and second yokes, and a housing for supporting said first yoke and said second yoke; and a vane having a wall portion, said vane being secured directly to a camshaft of an internal combustion engine and positioned relative to said first and second yokes so that said wall portion can pass through said preset space between said first yoke and said second yoke as the vane rotates with the camshaft;

wherein said housing is mounted on said internal combustion engine;

wherein positioning of the housing of said sensor to the internal combustion engine is executed with positioning pins provided on the housing of said sensor or the internal combustion engine, said positioning pins being positioned a predetermined radial distance from a center axis of said camshaft; and wherein a rotation angle of said shaft of the internal combustion engine is detected in accordance with a signal provided at said magnetic flux detecting device by passage of the wall portion of said vane through said space which blocks the passage of magnetic flux generated by said magnet.

* * * * *